(12) United States Patent
Lechanoine et al.

(10) Patent No.: US 12,496,371 B2
(45) Date of Patent: Dec. 16, 2025

(54) DIFFUSER SYSTEM

(71) Applicant: ELC MANAGEMENT LLC, Melville, NY (US)

(72) Inventors: Marc Emile Lechanoine, New York, NY (US); Romain Julien Guillevic, Belz (FR); Chafik Gasmi, Paris (FR)

(73) Assignee: ELC MANAGEMENT LLC, Melville, NY (US)

( * ) Notice: Subject to any disclaimer, the term of this patent is extended or adjusted under 35 U.S.C. 154(b) by 393 days.

(21) Appl. No.: 18/085,231

(22) Filed: Dec. 20, 2022

(65) Prior Publication Data

US 2024/0197946 A1    Jun. 20, 2024

(51) Int. Cl.
*A61L 9/12* (2006.01)
*B60H 3/00* (2006.01)

(52) U.S. Cl.
CPC .............. *A61L 9/127* (2013.01); *A61L 9/125* (2013.01); *A61L 2209/133* (2013.01); *B60H 3/0014* (2013.01)

(58) Field of Classification Search
CPC .... A61L 9/127; A61L 9/125; A61L 2209/133; A61L 2209/134; A61L 9/12; A61L 9/122; A61L 2209/111; A61L 2209/12; B60H 3/0014
See application file for complete search history.

(56) References Cited

U.S. PATENT DOCUMENTS

| | | | |
|---|---|---|---|
| 9,585,980 B1 * | 3/2017 | Li | A61L 9/032 |
| 2013/0126630 A1 | 5/2013 | Majerowski et al. | |
| 2015/0129677 A1 | 5/2015 | Irvin | |

FOREIGN PATENT DOCUMENTS

| | | |
|---|---|---|
| KR | 20130008391 A | 1/2013 |
| KR | 101691786 B1 | 1/2017 |
| KR | 20190136251 A | 12/2019 |

OTHER PUBLICATIONS

International Application No. PCT/US2023/084679, International Search Report and Written Opinion, mailed Apr. 26, 2024.

* cited by examiner

*Primary Examiner* — Qingzhang Zhou
(74) *Attorney, Agent, or Firm* — MARSHALL, GERSTEIN & BORUN LLP

(57) ABSTRACT

A customizable fragrance delivery system includes a base, one or more stems, one or more containers, and one or more fragrances. The one or more stems are retained by the base and are each coupled to a respective container. Each container defines a container cavity adapted to hold a fragrance. A movable vent mechanism selectively allows each fragrance to be diffused from their respective container. Multiple fragrances, each having a unique olfactory profile, may be diffused by the fragrance delivery system.

19 Claims, 9 Drawing Sheets

DIFFUSER SYSTEM

FIELD OF THE DISCLOSURE

The present disclosure relates to a diffuser system, and specifically relates to a bouquet-like fragrance delivery system including a base, one or more stems, and one or more containers for diffusing one or more fragrances.

BACKGROUND

A flower bouquet can be both beautiful and fragrant, and the bouquet purchaser can customize the bouquet to reflect their aesthetic and scent preferences. For example, the purchaser may choose flowers in the bouquet based on fragrance (e.g., lavender, lily, orange blossom), color (e.g., purple, pink, white), and/or flower size and shape. The purchaser has the opportunity to mix and match various flowers within the bouquet to arrive at a custom bouquet having the appearance and scent preferred by the purchaser. Unfortunately, cut flowers last only a short while. A variety of products exist to distribute a fragrance in a home for a longer period of time, such as candles, air fresheners, and diffusers. However, such products typically distribute only one fragrance and have a set physical appearance, and as such do not provide a purchaser with the customizable beauty and fragrance of a fresh bouquet.

SUMMARY

The appearance and fragrance output of the disclosed diffuser system can be customized by a user to reflect their personal preferences. A user may select one or more stems, each of which is coupled to a container having a fragrance contained therein, all of which are retained by a base. A user has the opportunity to customize the appearance of the diffuser system in at least the following ways: by selecting the style, color, size, and appearance of the base; by selecting the number of stems and containers; by selecting the colors and sizes of the stems and containers; and by determining how to arrange the selected stems and containers within the base. Similarly, the user may customize the overall fragrance of the diffuser system in at least the following ways: by selecting the number of different fragrances, by determining a preferred ratio between the selected fragrances, and by determining an overall quantity of fragrance to be distributed by the diffuser system. In addition, the diffuser system may include an illumination system to illuminate the diffuser system and movable vent mechanisms to allow selective diffusing of one or more fragrances. Furthermore, a container may be repositionable from a stem to a wearable accessory or alternate mount, thereby providing additional functionality as a portable diffuser.

In accordance with an example, a system for containing a diffusing a fragrance includes a first base, at least one stem, at least one container, and a first fragrance. The first base has at least one opening. The at least one stem is adapted to couple with and be retained by the first base. The at least one stem includes a first end having a stem coupling member. The at least one container has a first end and a second end and defines a container cavity. The first end of the at least one container has a container coupling member adapted to operably couple with the stem coupling member of the at least one stem. The first fragrance is disposed within the container cavity of the at least one container.

In accordance with another example, a customizable fragrance delivery system includes a base, a plurality of stems, a plurality of containers, a first fragrance, and a second fragrance. The base has at least one opening. The plurality of stems are adapted to couple with and be retained by the base. Each of the plurality of stems includes a first end having a stem coupling member. Each of the plurality of containers have a first end, a second end, and a movable vent mechanism to selectively allow a fragrance to be diffused from the container. Each of the plurality of containers defines a container cavity having a first end with a container coupling member adapted to operable couple with the stem coupling member of at least one stem of the plurality of stems. A first fragrance is disposed within the container cavity of a first one of the plurality of containers. The first fragrance has a first olfactory profile. A second fragrance is disposed within the container cavity of a second one of the plurality of containers. The second fragrance has a second olfactory profile that is different than the first olfactory profile.

In some forms, a system may further include a second base having a base coupling member to operably couple with the container coupling member of the at least one container or a desired one of the plurality of containers. The second base may include at least one of a wearable accessory or a mount.

In some forms, an illumination system may be adapted to illuminate a portion of the at least one container or a portion of the plurality of containers. The at least one stem or each of the plurality of stems may include a hollow interior, and the illumination system may include a light emitting element operably coupled with the first base. In operation, light emitted from the light emitting element may pass through the hollow interior of the at least one stem or each of the plurality of stems to the at least one container or a respective container coupled therewith. Alternately or in addition, the illumination system may include at least one light emitting element positioned along at least one of the stem or the at least one container, positioned along each of the plurality of stems, and/or positioned along each of the plurality of containers. The at least one stem or each of the plurality of stems may electrically couple the at least one light emitting element with a power source.

In some forms, the at least one container may include a movable vent mechanism to selectively allow the fragrance to be diffused from the container. The at least one container or each of the plurality of containers may include a shell dimensioned to receive a reloadable filter. The stem coupling member or each of the stem coupling members may include at least one air intake aperture, the at least one container or each of the plurality of containers may include at least one air exhaust aperture, and the respective at least one air intake aperture and at least one air exhaust aperture may be in fluid communication.

In some forms, a system may include a second container having a first end and a second end and defining a container cavity adapted to receive a second fragrance. The first end of the second container may have a container coupling member adapted to operably couple with the stem coupling member of the stem, and a second fragrance may be disposed within the container cavity of the second container.

BRIEF DESCRIPTION OF THE DRAWINGS

The figures described herein depict various aspects of the system and methods disclosed herein. It should be understood that each figure depicts an example of aspects of the present systems and methods.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
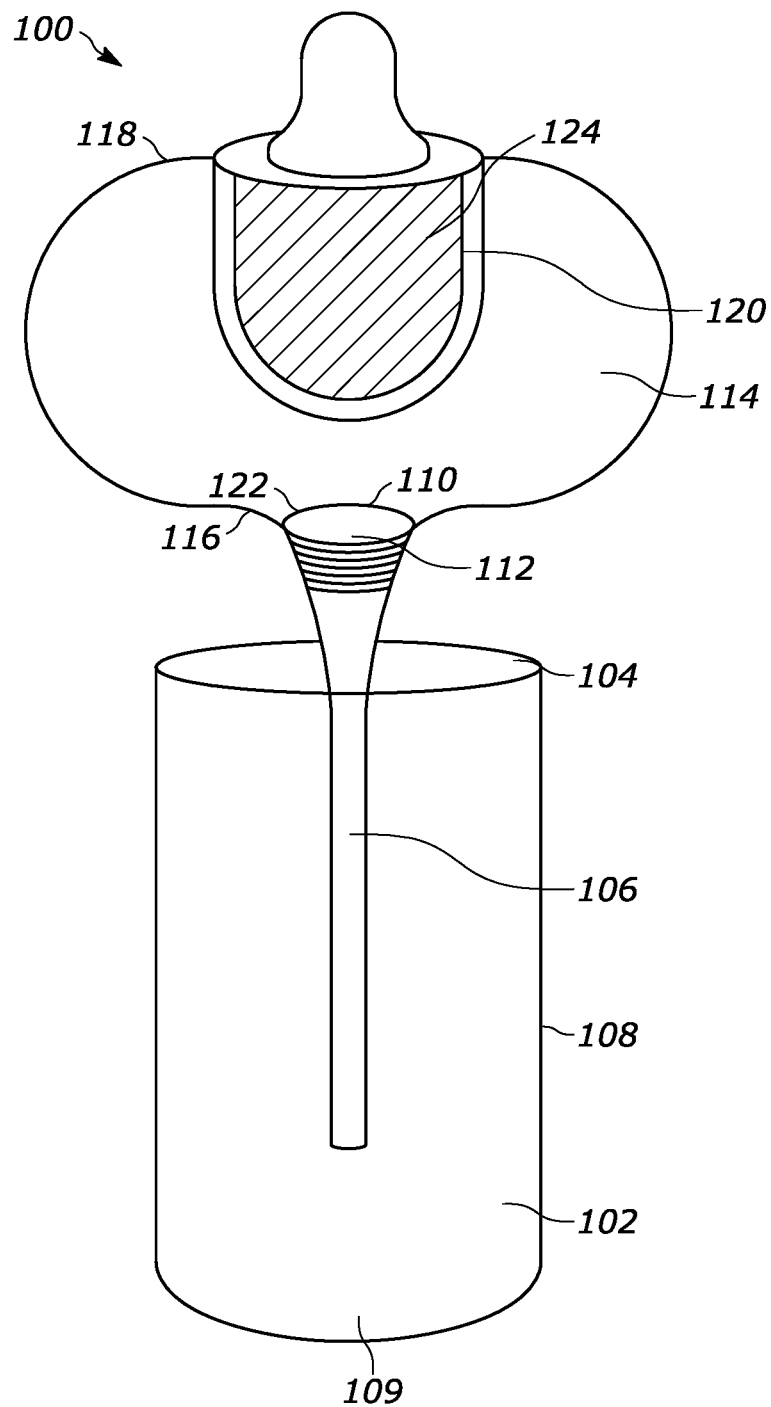
FIG. 1 is a front view of a first example fragrance delivery system having a single stem and a single container disposed within a first base.

FIG. 1 shows a system 100 for containing and diffusing a fragrance. The system 100 includes a first base 102 having at least one opening 104. A stem 106 is adapted to couple with and be retained by the base 102. In the arrangement shown in FIG. 1, the first base 102 is in the form of a cylindrical vase, such as, for example, a bud vase, having a side 108 and a bottom 109. The stem 106 is inserted through the opening 104 toward the bottom 109 and leans against the side 108 of the first base 102. However, in other arrangements, the base 102 may be a larger or different sized vase or may have a different shape and configuration entirely. Furthermore, in other arrangements, the stem 106 may be secured to the base 102 in a different manner (by a fastener or friction fit, for example) rather than leaning against a side 108 of the base 102.

The stem 106 has a first end 110 that has a stem coupling member 112 for operably coupling with a container 114. The container 114 has a first end 116 and a second end 118 and defines a container cavity 120. The first end 116 of the container 114 has a container coupling member 122 adapted to operably couple with the stem coupling member 112. For example, the stem coupling member 112 may be a screw and the container coupling member 122 may be a screw hole or vice versa. In some arrangements, the stem coupling member 112 may be an aperture and the container coupling member 122 may be a projection with dimensions allowing a friction fit within the aperture or vice versa. In yet other examples, the stem coupling member 112 may be a surface having a temporary adhesive and the container coupling member 122 may be a surface adapted to adhere to the adhesive or vice versa. In still other forms, the stem coupling member 112 and the container coupling member 122 may both be magnets adapted to connect via magnetic force. A combination of these features, or other conventional coupling means, may also be used as stem coupling member 112 and container coupling member 122.

A first fragrance 124 is disposed within the container cavity 120. The first fragrance 124 may be provided in a wax, liquid, jelly, solid material, or another medium. The first fragrance 124 may be placed within the container cavity 120 with a sponge or other cushion or encapsulated in full or in part within a porous material. In some examples, the container cavity 120 is refillable to allow the first fragrance 124 to be replaced. In some arrangements, the container cavity 120 and the first fragrance 124 may be visible through the container 114 if the container 114 is made from a transparent or translucent material such as glass. In other arrangements, the container 114 may be opaque and the container cavity 120 may not be visible. For example, the container 114 may be made from wood, ceramic, or metal. The container 114 may be colored, may include a pattern or design, or may be substantially clear and minimalist. The shape of the container 114 may substantially resemble a traditional geometric solid (a sphere, cylinder, or inverted pyramid, for example), may resemble a flower bud or other natural element, or may have an eccentric or unconventional shape. In other examples, the container 114 may not include a refillable insert and instead may be in the form in of a jar. In any of these examples, the container 114 may or may not be refillable. Other arrangements are possible.

Figure 2:
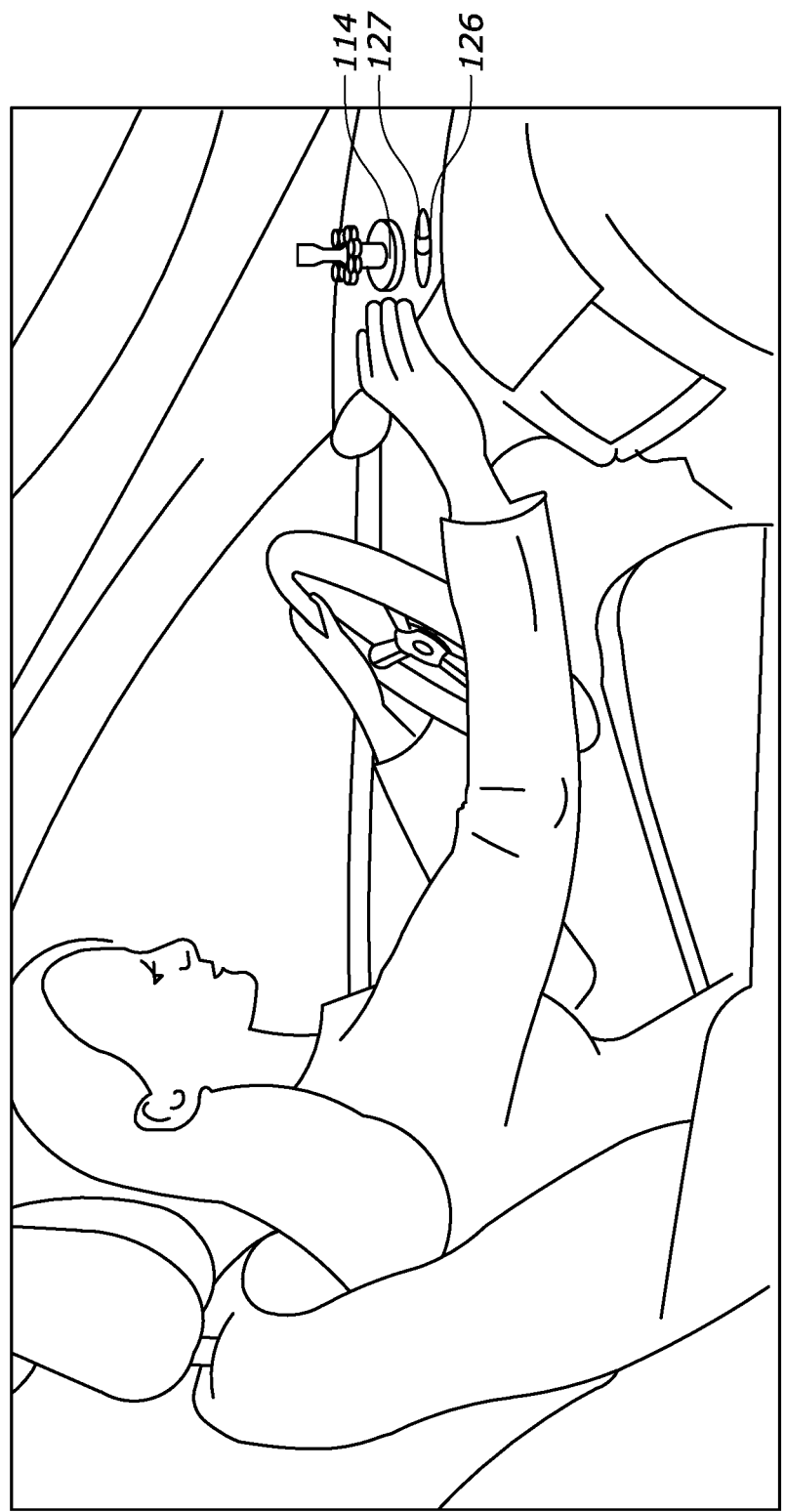
FIG. 2 is a perspective view of the single container from FIG. 1 disposed in a second base.

FIG. 2 shows a second base 126 for use with the container 114. In FIG. 2, the second base 126 is shown as a stand securable on the dash of a vehicle. In other arrangements, the second base 126 may be a wearable accessory or mount. For example, the second base 126 may be a necklace, bracelet, ring, brooch, a vase having a different aesthetic, a wall mount, a hanging basket, a window box, a jewelry box, a bath or shower accessory, or the like. A user of the system 100 can decouple the container 114 from the first base 102 and couple the container 114 with the second base 126. In the arrangement shown, the stem 106 is removed from the container 114 prior to placement in the second base 126. The second base 126 includes a base coupling member 127 that may couple with the container coupling member 122 (shown in FIG. 1). However, in other arrangements, the stem 106 may remain connected to the container 114 when the container 114 is moved to the second base 126. The stem 106 may then be coupled with and retained by the second base 125.

Figure 3:
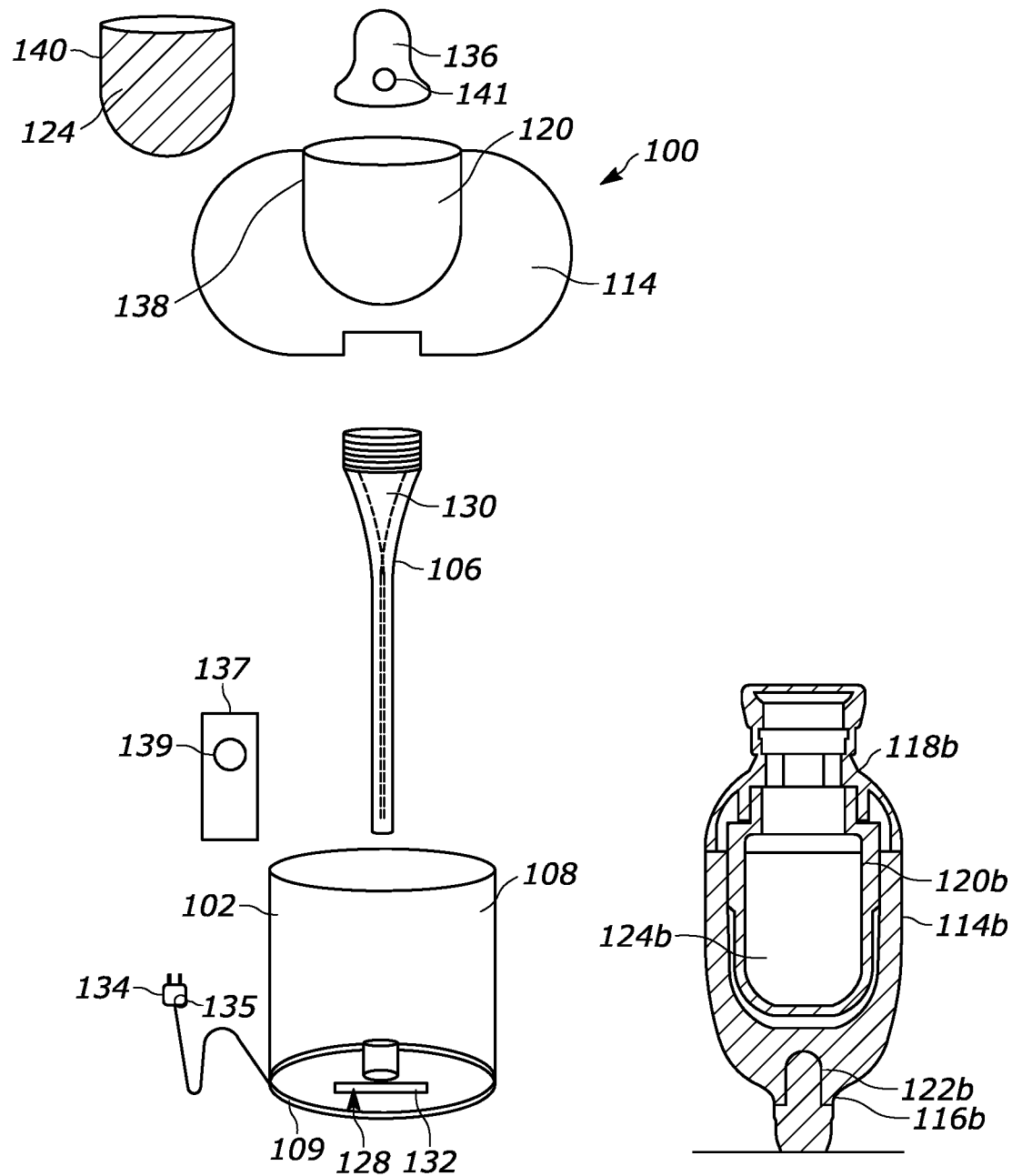
FIG. 3 is a cross-sectional exploded view of the first example system of FIG. 1.

FIG. 3 illustrates an illumination system 128 of the system 100 that is adapted to illuminate at least a portion of the container 114. As shown, the stem 106 includes a hollow interior 130. The illumination system 128 includes a light emitting element 132, such as an LED, that is operably coupled with the first base 102. Light emitted from the light emitting element 132 passes through the hollow interior 130 of the stem 106. Alternately or in addition, the illumination system 128 may comprise at least one light emitting element 132 positioned along the stem 106 or the container 114. The stem 106 may electronically couple the at least one light emitting element 132 with a power source 134. Alternatively, the at least one light emitting element 132 may be coupled with the power source 134 via another connection. The power source 134 may be a battery or an electrical plug adapted to conduct electricity from an outlet. The power source 134 may have a manual on/off button 135 provided directly on or in wired communication with the power source 134. Alternately, the power source 134 may be wirelessly connected to a remote device 137 on which an on/off button 139 is provided. The on/off button 135 may be provided anywhere on the system 100, including at a bottom of the first base 102, on the power source 134, at the top of the first base 102, or on one or a plurality of stems 1006 or containers 114. In other arrangements, the light emitting element 132 may be positioned along the side 108 or at the bottom 109 of the base 102 to provide uplighting. The light emitted by the light emitting element 132 may be white light, may be colored light, or may be configured to change color and/or temperature based on input from a user. In some examples, the stem 106 may be adapted to transmit power from the base 102 to the container 114, whereby upon coupling the base 102 with the stem 106 and the container 114, a light emitting element carried by the container 114 may become illuminated. Other examples are possible.

As also shown in FIG. 3, the container 114 may include a movable vent mechanism 136 to selectively allow the fragrance 124 to be diffused from the container 114. In FIG. 3, the movable vent mechanism 136 is a lid that covers the opening 104 of the base 102. In some arrangements, a seal may be provided between the lid and the container 114 to prevent the fragrance 124 from diffusing through small gaps between the lid and the container 114. The movable vent mechanism 136 (i.e., the lid) in FIG. 3 can be completely removed from the container 114 to maximize the fragrance diffusion. In other arrangements, the movable vent mechanism 136 may be integral with the container 114, such as a flap or shutter arrangement. The movable vent mechanism 136 may be selectively opened (e.g., by removing the lid or opening a flap) or closed (e.g., by replacing the lid or closing the flap). Further, in some arrangements, the movable vent mechanism 136 may be partially opened (e.g., by covering only part of the opening 104 with the lid, or by opening the flap only a portion of its possible trajectory) to diffuse a select amount of the fragrance 124. The movable vent mechanism 136 may be powered by, for example, the power source 134 to actively generate air flow for purposes of fragrance diffusion or may have a separate power source incorporated therein (such as batteries). The movable vent mechanism 136 may include a fan 141. Rather than being a lid, the movable vent mechanism 136 and fan 141 may be connected to the first base 132 or any other component of the system 100. In other arrangements, the movable vent mechanism 136 may not actively generate airflow by a fan 141 and may instead simply be opened to allow the fragrance 124 access to the surrounding atmosphere.

In FIG. 3, the container 114 includes a shell 138 defining the container cavity 120 that is dimensioned to receive a reloadable filter 140 that contains the fragrance 124. As shown, the reloadable filter 140 is a separate consumable product that simplifies the process of reloading the container 114 with fragrance. A user can place the reloadable filter 140 upon the shell 138 without considering or metering out a particular quantity of the fragrance 124 and can discard the reloadable filter 140 when the fragrance 124 is depleted without cleaning the shell 138. As shown, the reloadable filter 140 has an outer geometry that is complementary to the geometry of the shell 138. In other arrangements, the reloadable filter 140 may not be complementary to the shell 138 and may instead simply have outer dimensions that are smaller than the dimensions of the shell 138 such that the reloadable filter can be placed upon the shell 138 with more limited contact. For example, the reloadable filter 140 may be a sphere that sits upon the shell 138 within the container 114 with only the bottom of the sphere in contact with the shell 138. Some users may prefer to use a reloadable filter 140 within the container 114 at some times and may at other times prefer to fill the container 114 with the fragrance 124 directly without the use of a reloadable filter 140 by, for example, pouring the fragrance 124 into the container 114 from a vial.

The system 100 may be designed to allow the first container 114 to be replaced with a second container 114b on the stem 106. The first container 114 and the second container 114b may have different appearances—for example, different colors, shapes, sizes, patterns, or transparencies. Alternately or in addition, the first container 114 and the second container 114b may be configured to hold different quantities or types of fragrance. Accordingly, a user of the system 100 may opt to switch between the first container 114 and the second container 114b depending on what appearance or fragrance the user is in the mood to see and smell. As shown in FIG. 3, the system 100 may include a second container 114b having a first end 116b and a second end 118b and defining a container cavity 120b adapted to receive a second fragrance 124b. The first end 116b of the second container 114b has a container coupling member 122b adapted to operable couple with the stem coupling member 112 of the stem. A second fragrance 124b is disposed within the container cavity 114b of the second container 114b.

Figure 4:
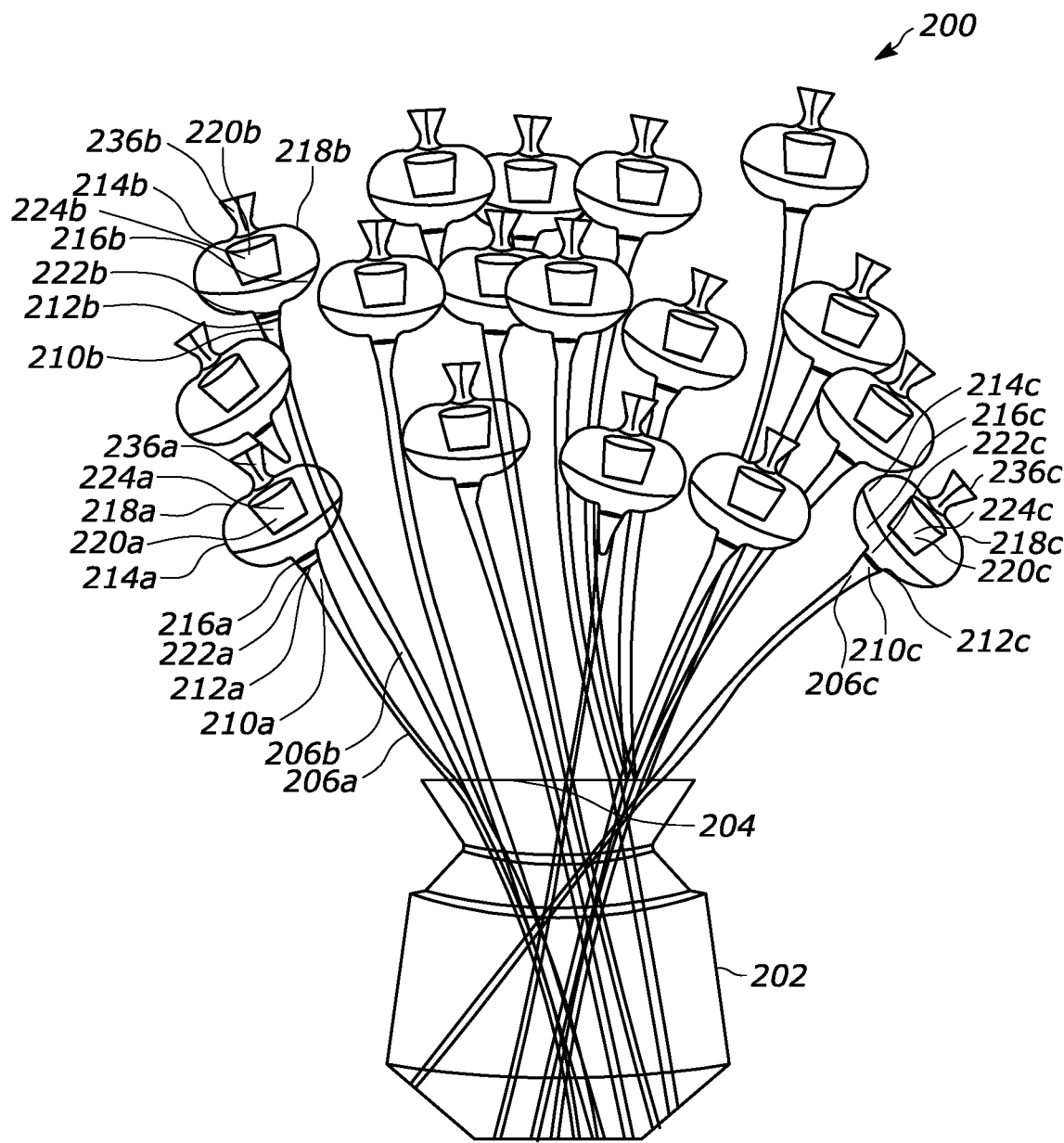
FIG. 4 is a front view of a second example fragrance delivery system having a plurality of stems and containers disposed within a base.
Figure 5:
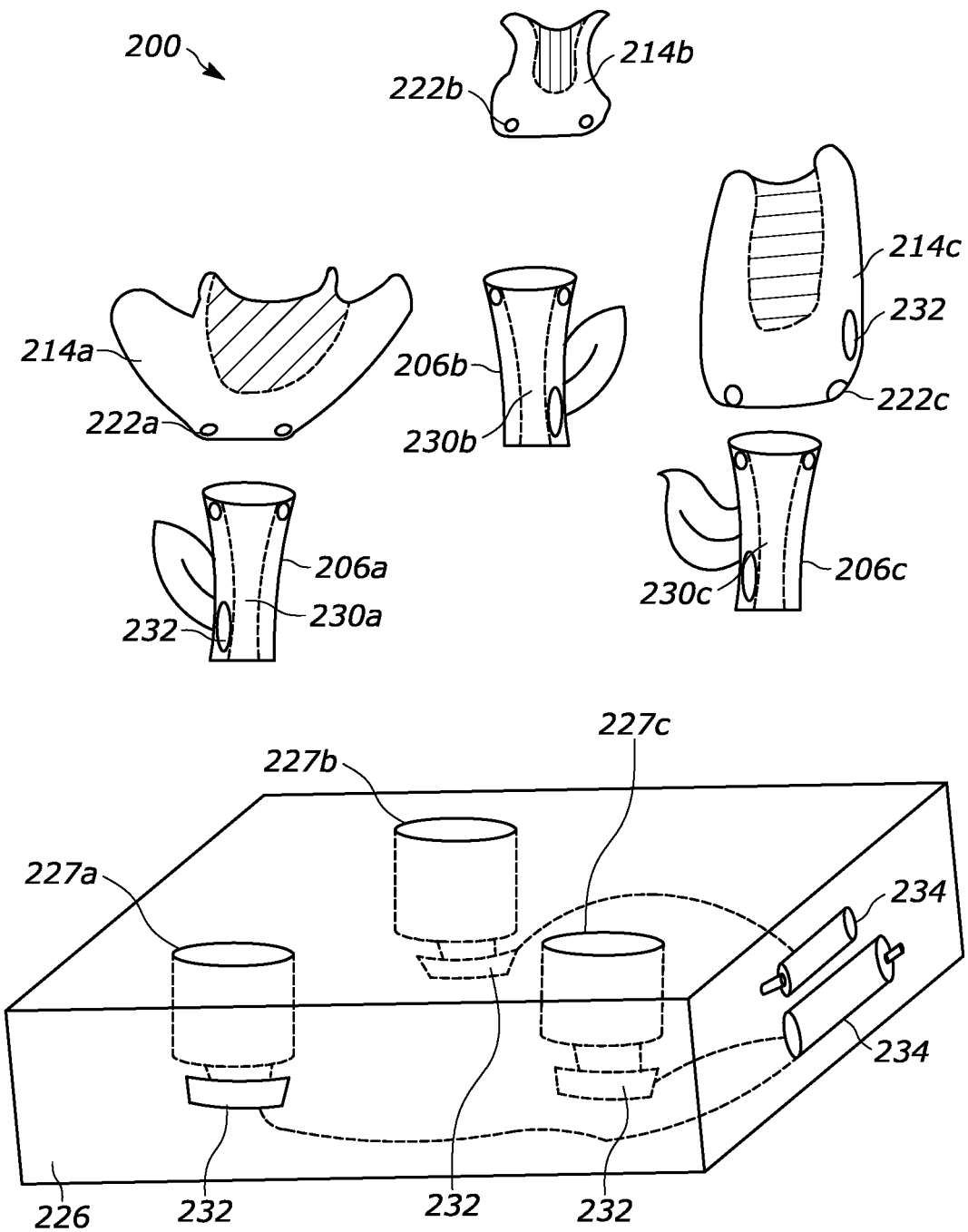
FIG. 5 is a front perspective view of a third example fragrance delivery system including an illumination system and power source.

Turning to FIGS. 4 and 5, a customizable fragrance delivery system 200 is shown for containing and diffusing one or more fragrances. It will be appreciated that the system 200 illustrated in FIGS. 4 and 5 may include similar features to the system 100 and/or may be an expansion of the system 100, and thereby elements illustrated in FIGS. 4 and 5 are designated by similar reference numbers indicated on the arrangements illustrated in FIGS. 1-3, increased by 100. Accordingly, these features will not be described in substantial detail. Further, it is appreciated that any combination or sub-combination of features described in regard to the system 200 may be incorporated into the system 100, and vice-versa.

As shown in FIG. 4, the customizable fragrance delivery system 200 includes a first base 202. The first base 202 is shown in FIG. 4 with one opening 204. In alternate arrangements, the first base 202 may include a plurality of openings 204 (204a, 204b, 204c) as shown and discussed with respect to FIG. 5 below. A plurality of stems 206 (206a, 206b, 206c . . . ) are adapted to couple with and be retained by the first base 202. Each of the plurality of stems 206 include a first end 210 (210a, 210b, 210c . . . ) having a stem coupling member 212 (212a, 212b, 212c . . . ). The system 200 also includes a plurality of containers 214 (214a, 214b, 214c . . . ). Each of the plurality of containers 214 have a first end 216 (216a, 216b, 216c . . . ), a second end 218 (218a, 218b, 218c . . . ), and a movable vent mechanism 236 (236a, 236b, 236c . . . ) to selective allow a fragrance to be diffused from the container. Each of the plurality of containers 214 define a container cavity 220 (220a, 220b, 220c . . . ). The first end 216 of each of the plurality of containers 214 have a container coupling member 222 (222a, 222b, 222c . . . ) adapted to operable couple with a respective stem coupling member 212 of a respective stem 206. Alternately, in some arrangements, each stem 206 may have more than one stem coupling member 212 such that more than one of the containers 214 may be connected to a single stem 206.

The system 200 allows more than one fragrance to be diffused at a time. For example, a first fragrance 224a having a first olfactory profile may be disposed within the container cavity 220a of a first container 214a while a second fragrance 224b having a second olfactory profile that is different than the first olfactory profile may be disposed with the container cavity 220b of a second container 214b. Additional fragrances having other olfactory profiles may optionally be provided in other containers (e.g., 214c . . . ) of the plurality of containers 214. A user of the system 200 can select the number and types of fragrances 224 to be diffused and can determine a preferred ratio of the selected fragrances. For example, a user may opt to use three different fragrances 224 distributed among six different containers 214 with a 1:1:1 ratio such that each fragrance 224 is provided in two containers 214. As another example, a user may opt to use three different fragrances 224 distributed among six different containers 214 with a 1:2:3 ratio such that the first fragrance 224 is provided in one container 214, the second fragrance 224 is provided in two containers 214, and the third fragrance 224 is provided in three containers 214. A variety of permutations of number of fragrances, number of containers, and preferred ratios are possible.

Turning to FIG. 5, a second base 226 is shown having base coupling members 227 (227a, 227b, 227c). In some arrangements, the second base 226 may be configured to include one base coupling member 227 operable to couple with the container coupling member 222 of a desired one of the plurality of containers 214 (such that the second base 226 is the same as the second base 126 in FIG. 2). Alternately, as shown FIG. 5, the second base 226 may include a plurality of base coupling members 227 that each couple with a respective stem 206. The second base 226 may have a different appearance, structure, or functionality than the first base 202. For example, the second base 226 may be configured to hold a different number of containers 214 than the first base 202. Accordingly, a user of the system 200 may opt to use the first base 202 and the second base 226 for different purposes or to present a different aesthetic, and the user may have additional bases available for use with the containers 214 in the same way that a collection of vases may be desirable to optimally display different floral arrangements.

As shown in FIG. 5, an illumination system 228 of the second base 226 is adapted to illuminate a portion of the plurality of containers 214. Each of the plurality of stems 206 includes a hollow interior 230. The illumination system 228 includes a light emitting element 232 operable coupled with the second base 226. In operation, light emitted from the light emitting element 232 passes through the hollow interior 230 of each of the plurality of stems 206 to a respective container 214. The illumination system 228 may additionally or alternately includes a light emitting element 232 positioned along each of the plurality of stems 206 and/or each of the plurality of containers 214. In the arrangement shown, each of the plurality of stems 206 electrically couples a light emitting element 232 with a power source 234 (shown as a set of batteries). The light emitting elements 232 may be alternately be coupled with the power source 234 via alternate electrical connections within the second base 226.

Figure 6A:
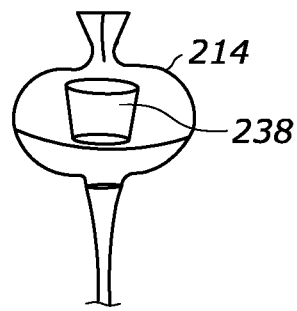
FIG. 6A is a front view of a first example container.
Figure 6B:
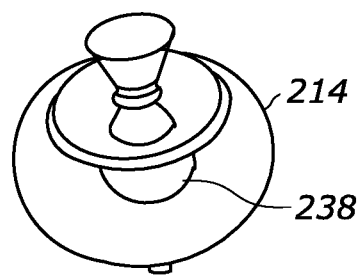
FIG. 6B is a perspective view of the first example container of FIG. 6A.
Figure 7A:
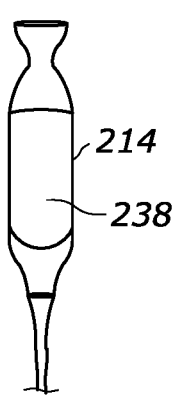
FIG. 7A is a front view of a second example container.
Figure 7B:
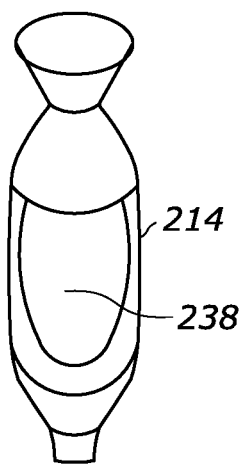
FIG. 7B is a perspective view of the second example container of FIG. 7A.
Figure 8A:
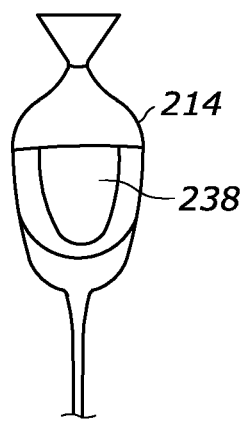
FIG. 8A is a front view of a third example container.
Figure 8B:
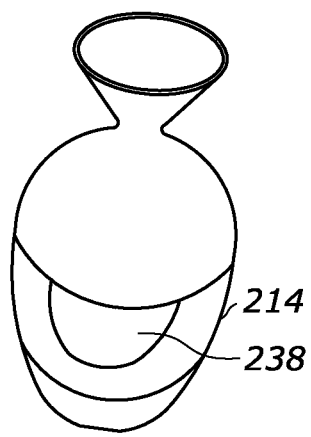
FIG. 8B is a perspective view of the third example container of FIG. 8A.

FIGS. 6A-8B illustrate a number of varying appearances containers 214 may take. Each container 214 includes a shell 238 dimensioned to receive a reloadable filter (such as reloadable filter 140 discussed above). FIGS. 6A and 6B illustrate a container 214 that is relatively wide, substantially spherical, and somewhat squat. The shell 238 occupies a relatively small space within the container 214. FIGS. 7A and 7B illustrate a container 214 that is relatively narrow, substantially cylindrical, and tall. The shell 238 occupies nearly all of the space within the container 214. FIGS. 8A and 8B illustrate a container 214 of relatively medium width and height where the shell 238 and the container 214 both have a U-shaped cross-section with sides that are substantially parallel.

Figure 9:
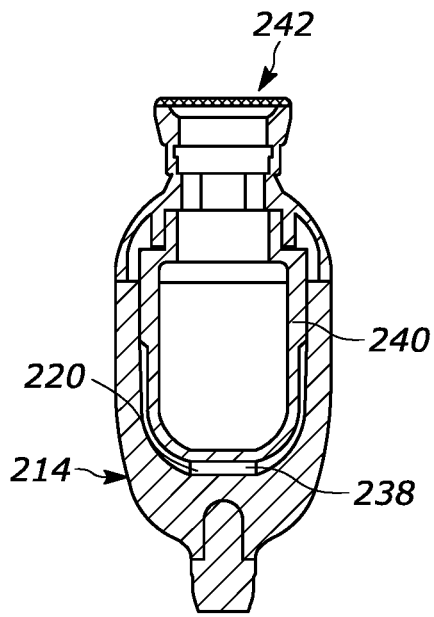
FIG. 9 is a cross-sectional view of an example container including a refillable plastic bottle.
Figure 10:
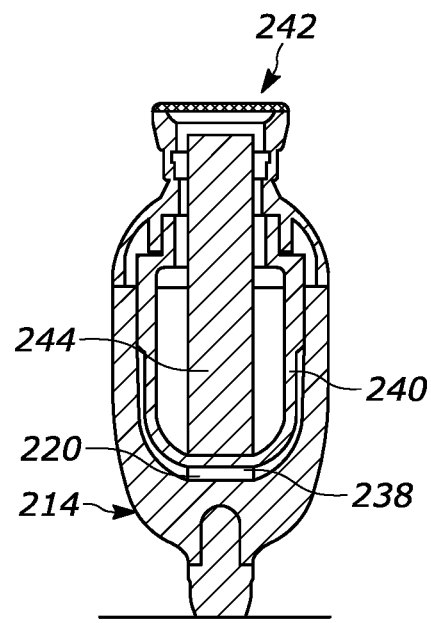
FIG. 10 is a cross-sectional view of an example container including a refillable plastic bottle and a wick.
Figure 11:
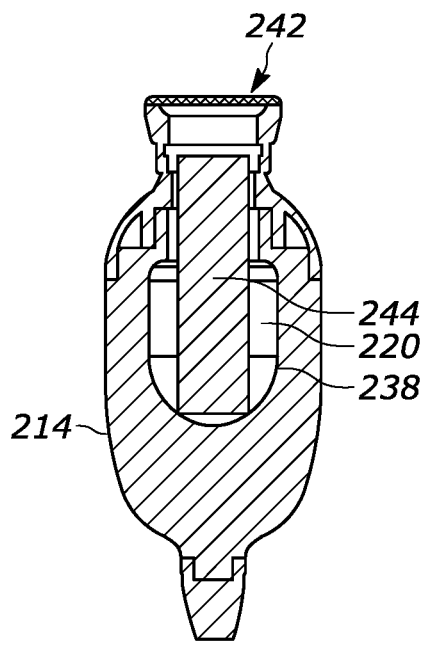
FIG. 11 is a cross-sectional view of an example container having only a shell and a wick.
Figure 12:
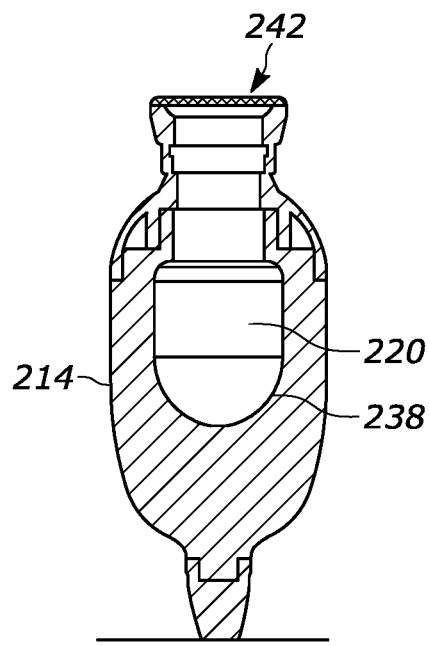
FIG. 12 is a cross-sectional view of an example container having only a shell.

FIGS. 9-12 illustrate containers 214 including, or not including, a plastic container and/or wick. All of the containers 214 in FIGS. 9-12 include a cavity 220 defined by a shell 238 and a grid 242 provided at the entrance to the cavity 220. In FIG. 9, a reloadable filter 240 is a plastic bottle with a geometry that is generally complementary to that of the shell 238. In FIG. 10, the container 214 includes a wick 244 within the reloadable filter 240. FIG. 11 illustrates a container 214 that does not have a reloadable filter 240 (e.g., a plastic bottle) but includes a wick 244 in the cavity 220. FIG. 12 illustrates a container 214 that is both wickless and does not include a reloadable filter, such that the cavity 220 is simply formed by the shell 238 and can be filled directly with a fragrance.

Figure 13:
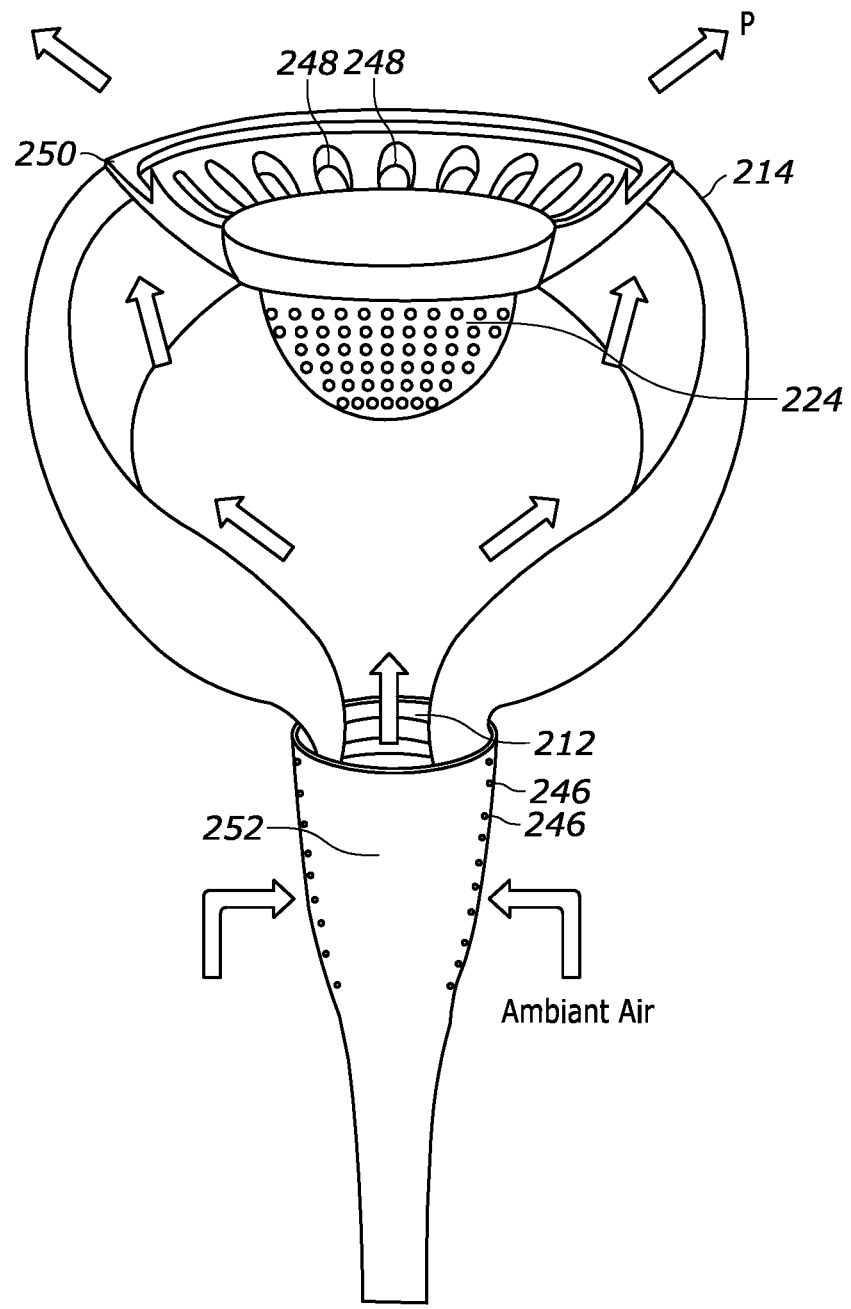
FIG. 13 is a cross-sectional view of an example container for a jelly or wax fragrance including air intake apertures and air exhaust apertures.

FIG. 13 is a cross-sectional view of an example container 214 for a jelly or wax fragrance 224 including air intake apertures 246 and air exhaust apertures 248. The container 214 shown in FIG. 13 includes an air vent 250 placed over the container cavity 220 and having the air exhaust apertures 248. The air vent 250 may be oxidized to assist with fragrance diffusion. The stem coupling member 212 includes an air rotary 252 in which the air exhaust apertures 248 are disposed. In alternate arrangements, the stem coupling member 212 may have a single aperture that may be selectively opened. If the glass is optically transmissive such that sunlight can enter the container cavity 220 (e.g., if the container 214 is made from glass), air inside the container cavity 220 is heated above the temperature of the ambient air outside the container 214 such that natural convection encourages air flow through the container 214.

Figure 14:
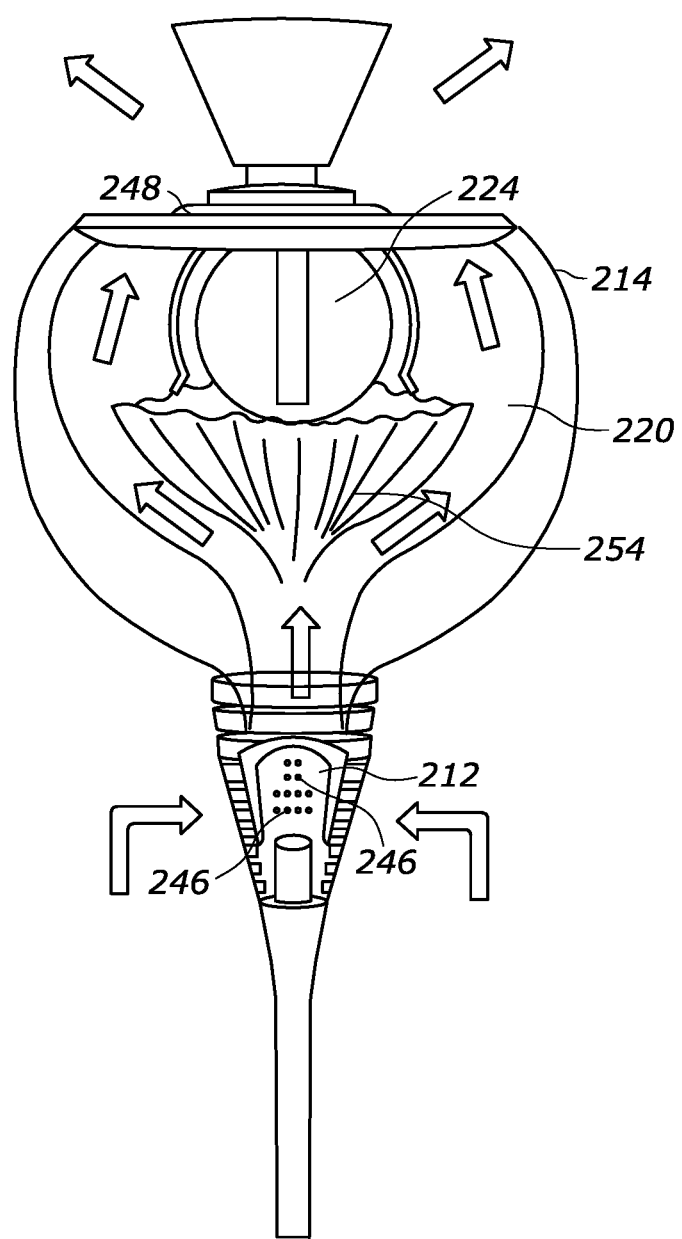
FIG. 14 is a cross-sectional view of an example container for a liquid fragrance including air intake apertures and an air exhaust aperture.

FIG. 14 is a cross-sectional view of an example container 214 for a liquid fragrance 224 including air intake apertures 246 within the stem coupling member 212 and a single air exhaust aperture 248 formed within the movable vent mechanism 236. The liquid fragrance is placed upon a cup 254. As with FIG. 13, if the glass is optically transmissive such that sunlight can enter the container cavity 220 (e.g., if the container 214 is made from glass), air inside the container cavity 220 is heated above the temperature of the ambient air outside the container 214 such that natural convection encourages air flow through the container 214.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A system for containing and diffusing a fragrance, the system comprising:
    a first base having at least one opening;
    at least one stem adapted to couple with and be retained by the first base, the at least one stem including a first end having a stem coupling member;
    at least one container having a first end and a second end and defining a container cavity, the first end of the at least one container having a container coupling member adapted to operably couple with the stem coupling member of the at least one stem; and
    a first fragrance disposed within the container cavity of the at least one container,
    wherein the at least one container includes a movable vent mechanism to selectively allow the fragrance to be diffused from the container.

2. The system of claim 1, further comprising a second base having a base coupling member to operably couple with the container coupling member of the at least one container.

3. The system of claim 2, wherein the second base includes a wearable accessory.

4. The system of claim 1, further comprising an illumination system adapted to illuminate a portion of the at least one container.

5. The system of claim 4, wherein the at least one stem includes a hollow interior, wherein the illumination system includes a light emitting element operably coupled with the first base, wherein in operation, light emitted from the light emitting element passes through the hollow interior of the at least one stem to the at least one container.

6. The system of claim 4, wherein the illumination system comprises at least one light emitting element positioned along the stem.

7. The system of claim 1, wherein the stem coupling member includes at least one air intake aperture, the at least one container includes at least one air exhaust aperture, and the at least one air intake aperture and the at least one air exhaust aperture are in fluid communication.

8. The system of claim 1, further comprising a second container having a first end and a second end and defining a container cavity adapted to receive a second fragrance, the first end of the second container having a container coupling member adapted to operably couple with the stem coupling member of the stem, and a second fragrance disposed within the container cavity of the second container.

9. A system for containing and diffusing a fragrance, the system comprising:
    a first base having at least one opening;
    at least one stem adapted to couple with and be retained by the first base, the at least one stem including a first end having a stem coupling member;
    at least one container having a first end and a second end and defining a container cavity, the first end of the at least one container having a container coupling member adapted to operably couple with the stem coupling member of the at least one stem; and
    a first fragrance disposed within the container cavity of the at least one container,
    further comprising an illumination system adapted to illuminate a portion of the at least one container,
    wherein the at least one stem includes a hollow interior, wherein the illumination system includes a light emitting element operably coupled with the first base, wherein in operation, light emitted from the light emitting element passes through the hollow interior of the at least one stem to the at least one container.

10. The system of claim 9, further comprising a second base having a base coupling member to operably couple with the container coupling member of the at least one container.

11. The system of claim 10, wherein the second base includes a wearable accessory.

12. The system of claim 9, wherein the illumination system comprises at least one light emitting element positioned along the stem.

13. The system of claim 9, wherein the stem coupling member includes at least one air intake aperture, the at least one container includes at least one air exhaust aperture, and the at least one air intake aperture and the at least one air exhaust aperture are in fluid communication.

14. The system of claim 9, wherein the at least one container includes a movable vent mechanism to selectively allow the fragrance to be diffused from the container.

15. The system of claim 9, further comprising a second container having a first end and a second end and defining a container cavity adapted to receive a second fragrance, the first end of the second container having a container coupling member adapted to operably couple with the stem coupling member of the stem, and a second fragrance disposed within the container cavity of the second container.

16. The system of claim 2, wherein the second base includes a mount.

17. The system of claim 4, wherein the illumination system comprises at least one light emitting element positioned along the at least one container.

18. The system of claim 10, wherein the second base includes a mount.

19. The system of claim 9, wherein the illumination system comprises at least one light emitting element positioned along the at least one container.

* * * * *